US009249341B2

(12) United States Patent
Sauls

(10) Patent No.: US 9,249,341 B2
(45) Date of Patent: Feb. 2, 2016

(54) CONTROL PANEL RESTORATION SYSTEM AND METHOD

(71) Applicant: Don Sauls, Odessa, TX (US)

(72) Inventor: Don Sauls, Odessa, TX (US)

( * ) Notice: Subject to any disclaimer, the term of this patent is extended or adjusted under 35 U.S.C. 154(b) by 238 days.

(21) Appl. No.: 13/656,371

(22) Filed: Oct. 19, 2012

(65) Prior Publication Data

US 2014/0113119 A1 Apr. 24, 2014

(51) Int. Cl.
*C09J 7/02* (2006.01)
*B60K 37/06* (2006.01)
*B60H 1/00* (2006.01)

(52) U.S. Cl.
CPC ............ *C09J 7/0296* (2013.01); *B60H 1/00985* (2013.01); *B60K 37/06* (2013.01); *C09J 2203/334* (2013.01); *C09J 2400/226* (2013.01); *C09J 2400/283* (2013.01); *C09J 2433/00* (2013.01); *C09J 2463/00* (2013.01); *C09J 2475/00* (2013.01); *Y10T 428/24802* (2015.01); *Y10T 428/24934* (2015.01)

(58) Field of Classification Search
CPC . B32B 27/08; C09J 7/0296; Y10T 428/24802
USPC .......................................... 428/195.1, 211.1
See application file for complete search history.

(56) References Cited

U.S. PATENT DOCUMENTS

| 5,660,925 | A | * | 8/1997 | Cooley et al. | ............... | 428/304.4 |
| 6,196,738 | B1 | * | 3/2001 | Shimizu et al. | ............... | 400/490 |
| 2002/0172354 | A1 | * | 11/2002 | Nishi | ....................... | 379/433.07 |

* cited by examiner

*Primary Examiner* — Gerard Higgins
(74) *Attorney, Agent, or Firm* — Buskop Law Group, PC; Wendy Buskop

(57) ABSTRACT

A restoration system and method for vehicle interior controllers. After extended use, vehicle controllers often become worn or faded. This system and method provides an efficient and inexpensive alternative to replacing the entire vehicle control panel. The system is comprised of a label with an adhesive side and marked identifiers on the opposite side. The label is shaped to match the boundaries of the vehicle controllers. The marked identifier on the label appears substantially identical to the manufacturer's original identifier. The restoration method includes removing the faded identifiers from a controller, removing the debris from the controller, smoothing the surface of the controller for better bonding, and affixing the replacement label to the surface of the controller.

6 Claims, 6 Drawing Sheets

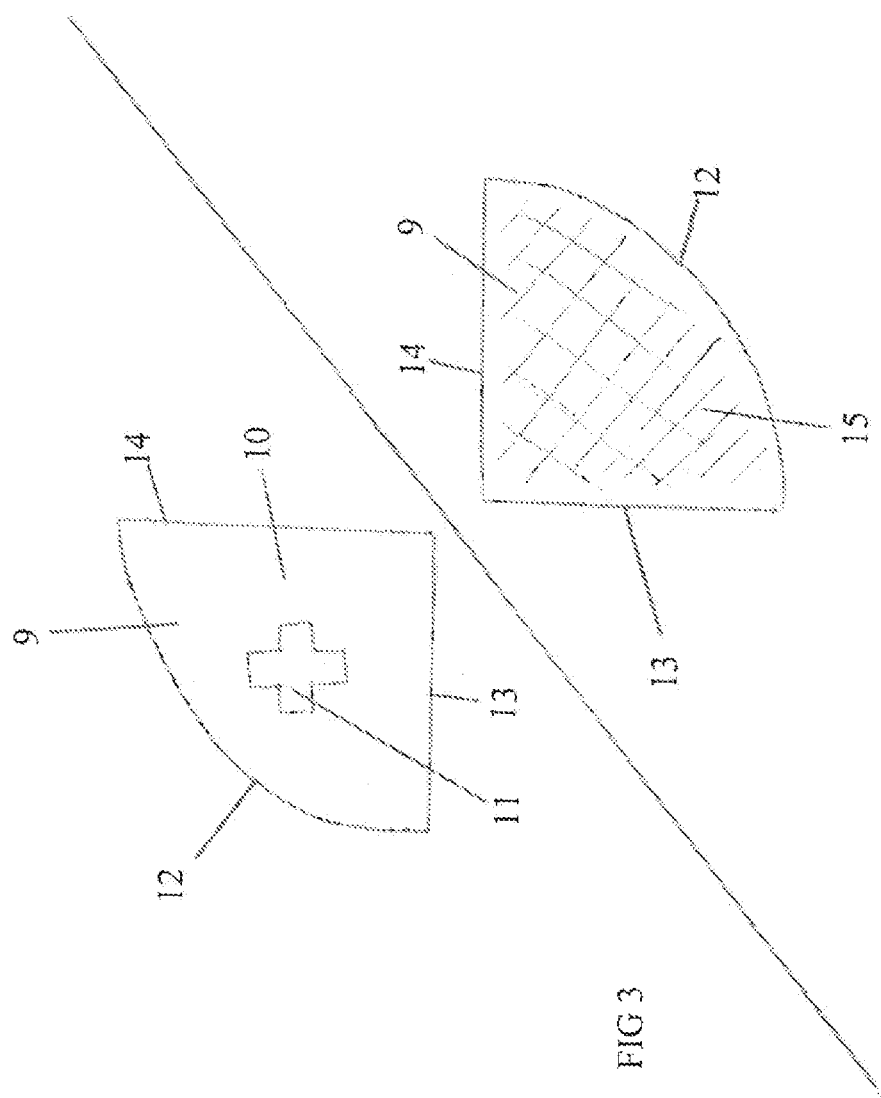

CONTROL PANEL RESTORATION SYSTEM AND METHOD

FIELD OF THE INVENTION

The present invention relates to vehicles, and in particular a vehicle interior restoration system and method.

BACKGROUND OF THE INVENTION

Conventional motor vehicles have a number of different types of controllers for various functions such as climate control, defroster activation, air flow mode control and others. The controllers allow users to adjust the temperature, fan, and the seat position among other things. When controllers are pressed down, or turned depressed, the corresponding function is activated. In order to identify different functions of the controllers, automobile manufacturers generally mark or label controllers with symbols, numbers, or icons. These identifiers clearly indicate to users the function that each controller serves. The identifiers are generally marked with color and/or the appropriate icons depending on the controllers' function. For example, heat controllers are generally marked red while cool or air conditioning controllers are marked blue. After extended use, the marked identifiers may become dilapidated, faded or potentially even completely worn off. As the identifiers fade, users are left without means to readily determine the functions of the controllers as well as with an aesthetically unpleasant view of the control panel. Additionally, the light source behind the faded controller may also produce a uneven and unsafe illumination that may distract the vehicle operator. Lotions, oil, and body secretions on hands of users also contribute to fading and disappearance of identifiers. Controllers that are used in a highly repetitive manner and exposed to high temperatures are also subject to fading as well as wear and tear. To address this problem, users may request the automobile dealers or repair shops to replace the controllers. However, this process can be inefficient and expensive because often times, the entire control panel must be replaced. In addition, faded identifiers are not aesthetically pleasing and discourage purchasers of used automobiles. Used automobile buyers often incorrectly associate additional, more severe automotive issues with faded control panels.

As an alternative, manufacturers have made controllers with protruding identifiers that are slightly raised from the controller's surface. However, these controllers can be costly to manufacture. If the protruding identifiers are made of different material from the controllers, the identifiers will eventually separate from buttons over time due to wear and tear. This is also not aesthetically pleasing and also can be costly to repair.

Some repair shops or automobile dealers attempt to solve the problem by repainting the identifiers. However this process is time consuming and not satisfactory due to potential smudging of the paint. Other repair specialists or auto detailers provide stickers with characters or symbols to replace the faded portion of the controllers. These individual labels are very complicated to use and can produce unsatisfactory results. For example, a user would be required to first locate and then remove the individual letters for the word heat (H, E, A, and T) from a large list of stickers. The user would then have to place the individual letters on the controllers, taking extra care to space and align the letters properly. In the case of an icon or symbol, the user would have to align the icon or symbol perfectly to avoid detection of the replacement label as an after-market device. In other prior art systems, the user would select a label from a large selection using transfer tape. The individual characters would be peeled away from the back of the label with a gripping tool. Transfer tape would be used again to apply the label to the controller. A heating element would be used to secure the placement of the new controller label.

Accordingly, the present invention overcomes the problems and disadvantages of the prior art. It is a restoration system that can be applied to the various surfaces on the interior of automobiles. The present system is an improvement over prior art because it is more efficient, aesthetically appealing, and inexpensive. The present restoration system practically eliminates chances for error or misalignment. It is also difficult to detect as an after-market device.

SUMMARY OF THE INVENTION

The present system is a restoration system comprised of an adhesive, a sheet of material, and a marking on the sheet of material. The dimensions of the controller define the perimeter of the label or overlay. Therefore the label-receiving area on the controller and the restoration label have the same shape. When the controller has gaps between the controller and the panel, the restoration label's boundaries will be aligned with the boundaries of the gap. This creates a uniform and continuous appearance that is not easily detected as an after-market addition to the automobile. Other technical features may be readily apparent to one skilled in the art from the following figures and descriptions.

The label system restores the original look of the control buttons. The labels are generally made of material that imitates the appearance of the controllers. For example, if the controller is made of black plastic, the material would appear glossy and black, virtually identical to the original controller. The material of the label may vary depending on what the controller is made of. The shape and color of the replacement label is defined by the original shape and color of the controller. The material may be paper, plastic, vinyl or any similar material. Generally, the identifiers on the controller and the replacement label will look identical. The identifier on the label is in the same position as the identifier on the controller.

In order for the label to bond to the controller, an adhesive is on the opposite side of the material with the identifier. A number of various types of adhesive may be added to increase the bonding depending on the material. Ideally, adhesive that bonds strongly and tightly yet resists damage from light, temperature and humidity are appropriate. Adhesives such as epoxy, cyanoacrylates, or any similar substance will serve the same purpose. Alternatively, the user may add the adhesive to the controller's surface instead of the label.

Before affixing the label, original identifiers must be removed to increase bonding and to create a smoother surface for the label to attach to. This removal process may be done by different methods according to the materials of the identifiers. For instance, for identifiers created by paint, a user may use a dull knife or sculpting knife. The user carefully removes the identifier by scratching any remaining identifier from the surface of the controller. For raised identifiers with any portion removed or hanging loose, the user may remove remaining portion of the identifier with sandpaper or a similar tool. Any remaining portion may be removed by scratching with a dull knife or a sculpting knife. The user may scratch surface area with sand paper to remove final remnants of identifiers and to create slightly rough textured surface to increase bonding strength of adhesive. These steps create a smooth and even label-receiving surface area for the controllers. If any portion of the original controller identifier remains, its outline may be visible through the newly placed label.

The user will clean the controller to remove any particles or debris before affixing the label to the controller. Users may use an alcohol based solution to clean the surface of the controller. An alcohol based cleanser will allow the user to manipulate and adjust the label freely before the adhesive on the label securely bonds to the controller. Once the label is positioned appropriately, the alcohol based cleanser will evaporate leaving the label securely bonded to the controller. Users may also use other fluids to cleanse the surface of the controller, such as window cleaner or any similar cleaning fluid. However, in the case of the non-alcohol based cleansers, the user will need to take care to position the label properly initially.

In affixing the label, the user may utilize various devices such as tweezers, fingers, or any other gripping tool. The user aligns the label's boundaries with the controller's boundaries and carefully applies it to the surface of the controller. After the label is attached, the user may apply pressure to remove any air bubble and to secure the label in its proper location.

OBJECTS

It is primary object of this invention to restore worn or faded controllers to a like new condition.

Another object of this invention is to provide a more economical way to restore the original look of a controller.

Another object of this invention is to provide an aesthetically pleasing view of a control panel with worn or faded controllers.

Another object of this invention is to provide an alternative to replacing the entire control panel when the controllers' identifiers fade or wear off.

Another object of this invention is to create increased resale value of a pre-owned vehicle with minimal investment.

It is a further objective of this invention is to provide a quick and efficient system for restoring faded identifiers in the interior of a vehicle.

BRIEF DESCRIPTION OF THE DRAWINGS

For a more complete understanding of this disclosure and its features, reference is now made to the following description, taken in conjunction with the accompanying drawings, in which:

FIG. 3 is a view of a front side of the restoration label
Ref. 9 is a label
Ref. 10 is the surface area of the label
Ref. 11 is the marked identifier on the label
Ref. 12 is the outer boundary of the label
Ref. 13 is the horizontal inner boundary of the label
Ref. 14 is the vertical inner boundary of the label
FIG. 4 is a view of a back side of the restoration label
Ref. 9 is a label
Ref. 12 is the outer boundary of the label
Ref. 13 is the horizontal inner boundary of the label
Ref. 14 is the vertical inner boundary of the label
Ref. 15 is the backside of the label

DETAILED DESCRIPTION OF THE PREFERRED EMBODIMENT

Figure 1:
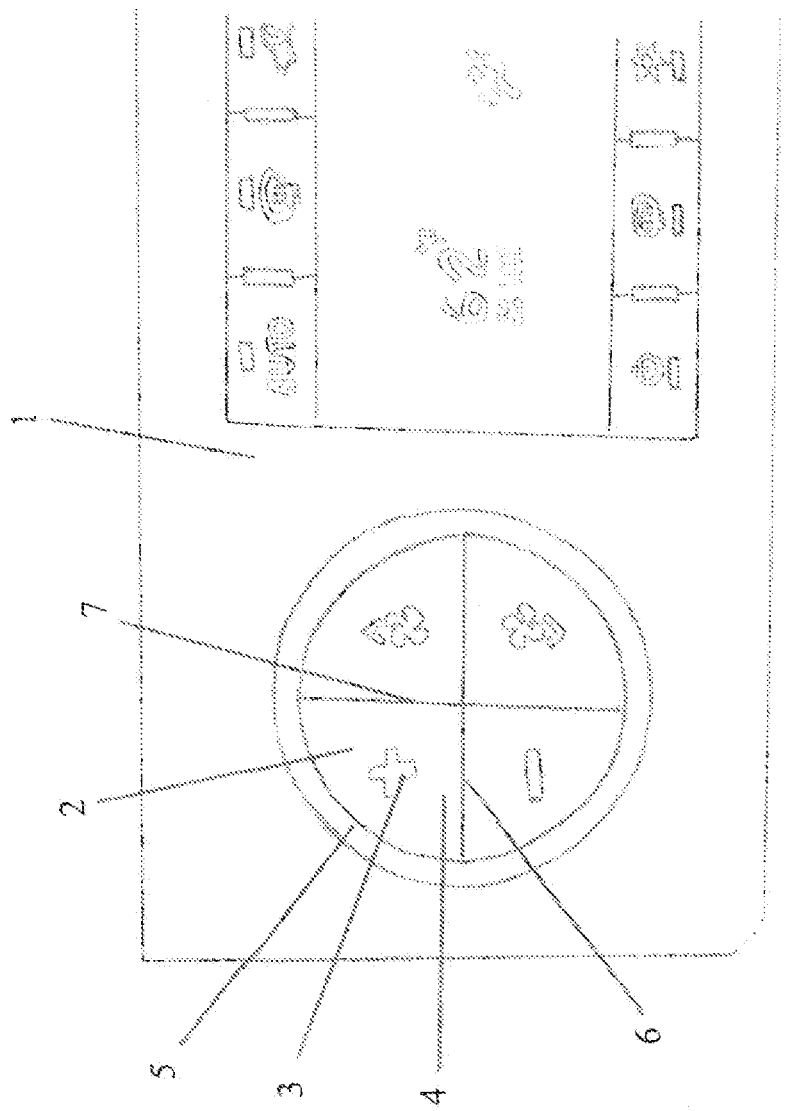
FIG. 1 is a view of a typical automobile control panel
Ref. 1 is an automobile control panel
Ref. 2 is a controller for a temperature adjustment
Ref. 3 is an identifier to indicate function of the controller
Ref. 4 is the surface area of the controller
Ref. 5 is the outer boundary of the controller
Ref. 6 is the horizontal inner boundary of the controller
Ref. 7 is the vertical inner boundary of the controller

While the above description is of the preferred embodiment of the present invention, it should be appreciated that the invention may be modified, altered or varied without deviating from the scope and fair meaning of the following claims.

Referring generally to FIGS. 1-7, the restoration system is designed to restore the original appearance of the control panel with new identifiers for worn out controllers. The restoration system is composed of a sheet of material, a marked identifier 11, and adhesive. The front of the sheet of material 10 is made of material that looks similar to the material of controllers 2. The identifier 11 is also marked on the front side of the label 10. The back of the label 15 includes a means to affix the label 9 to the controller 2. The restoration method includes removing the faded identifier 9 from the controller 2, smoothening and scratching the surface area of the controller 4, removing the debris, affixing the label 9, and applying pressure to secure label 9.

An automobile control panel 1 includes various controllers, for example buttons, knobs, and switches. A temperature controller 2 includes an identifier 3 that looks like a plus sign indicating its function (e.g. for increasing). The identifier 3 placed on the surface area 4 of the controller may be different depending on the automobile. The surface area 4 defines the perimeter for the label in FIG. 4. In this embodiment, the controller has an outer boundary 5, inner horizontal boundary 6 and inner vertical boundary 7, aligning with the label in FIG. 3. The restoration system involves carefully aligning the outer boundary of the controller 5 with the outer boundary of the label 12, the inner horizontal boundary 6 with the inner horizontal boundary of the label 13, and the inner vertical boundary 7 with the inner vertical boundary of the label 14.

Figure 2:
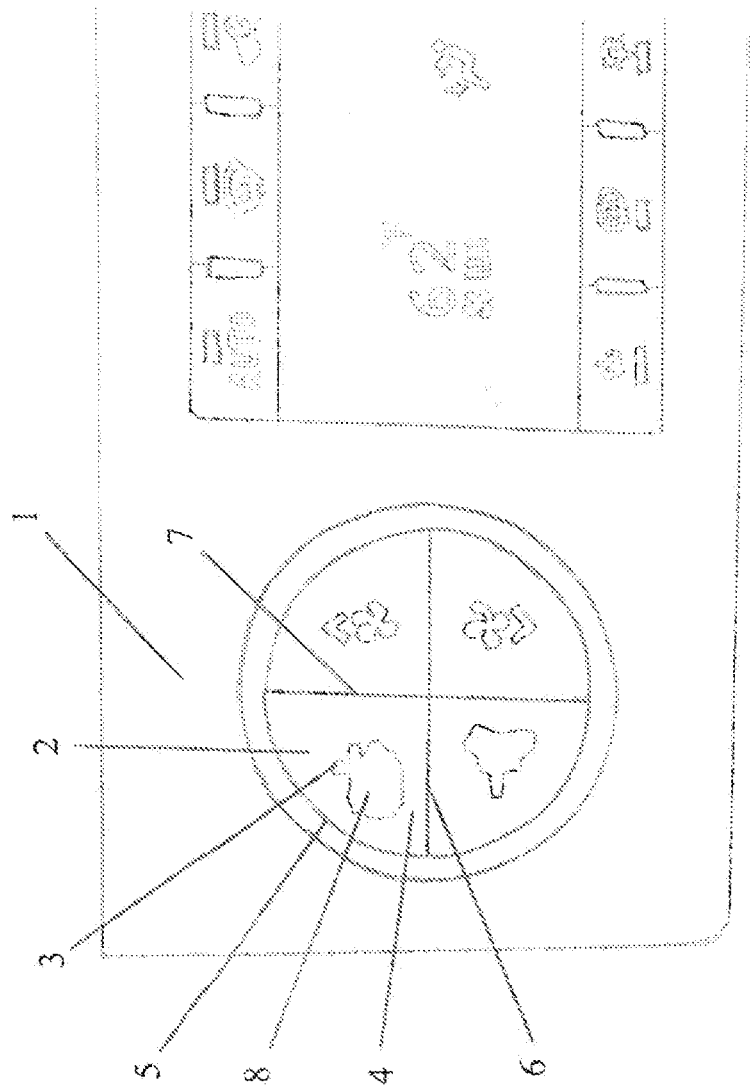
FIG. 2 is a view of a typical automobile controller with faded identifiers.
Ref. 1 is an automobile control panel
Ref. 2 is a controller for a temperature adjustment
Ref. 3 is an identifier to indicate function of the controller
Ref. 4 is the surface area of the controller
Ref. 5 is the outer boundary of the controller
Ref. 6 is the horizontal inner boundary of the controller
Ref. 7 is the vertical inner boundary of the controller
Ref. 8 is the faded identifier

FIG. 2 is the view of automobile controller with the worn off identifiers. An automobile control panel 1 includes various controllers, such as buttons, knobs, and switches. The controllers normally have identifiers to indicate that controllers function, such as increase or decrease. A temperature controller 2 includes an identifier 3 that looks like a plus sign indicating its function (e.g. for increasing). After repetitive use, the identifier 3 fades and eventually wears off 8 and users cannot readily identify the function of the controller 2. The surface area 4 defines the perimeter for the label in FIG. 4. In this embodiment, the controller has an outer boundary 5, inner horizontal boundary 6 and inner vertical boundary 7, aligning with the label in FIG. 3.

FIG. 3 is a front view of the label 9. The front view of the label includes a marked identifier 11 on the surface 10 of the label. The label includes an outer boundary 12, a horizontal inner boundary 13 and a horizontal outer boundary 14. The perimeter for the label 9 matches with the perimeter of the controller 2. When the label 9 is affixed to the surface area 4 of the controller, the outer boundaries of the label align with the outer boundaries of the controller. The restoration system involves aligning the outer boundary of the controller 5 with the outer boundary of the label 12, the inner horizontal boundary 6 with the inner horizontal boundary of the label 13, and the inner vertical boundary 7 with the inner vertical boundary of the label 14. The identifier 11 marked on the label 9 is identical with the identifier 3 marked on the controller 4 in its shape, size and color. The surface area of the label 10 is made of materials that create a visually similar look of the material of the controller 4. For example, if the controller 4 is made of black plastic, the surface area of the label 10 is made of materials, such as paper, plastic, or vinyl, that appear black and glossy to mimic the look of the original controller.

FIG. 4 is a back view of the label 9. The label includes an outer boundary 12, a horizontal inner boundary 13 and a horizontal outer boundary 14. An adhesive applied to the back of the label 15, the opposite side from the marked identifier 11 as a means to affix the label 9 to the controller 2. Alternatively, the adhesive may be added to the surface area of the controller 4 for the attachment of label 9. The adhesive may vary depending on the material of the label or label 9.

Figure 5:
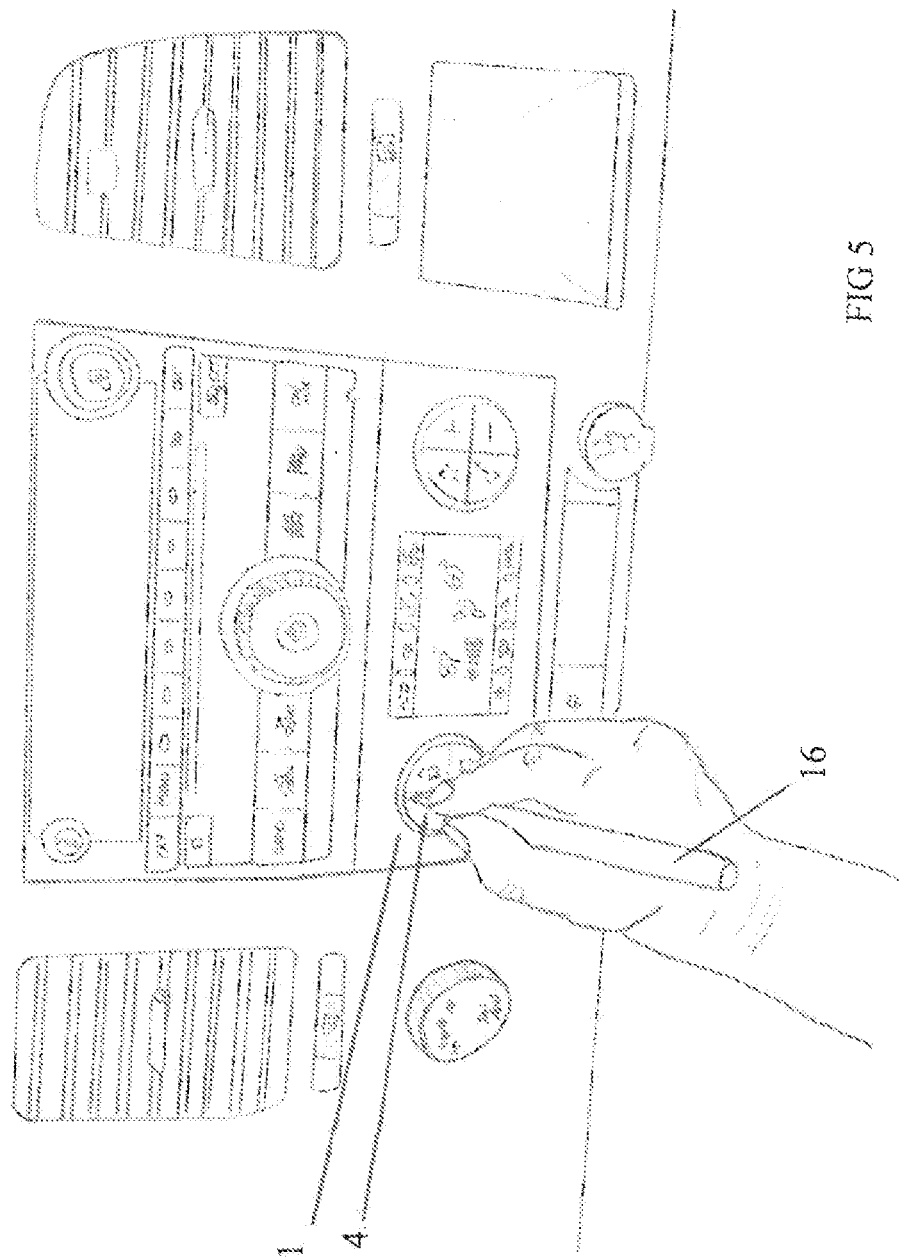
FIG. 5 is a view of the user removing a damaged identifier
Ref. 1 is an automobile control panel
Ref. 4 is the surface area of the controller
Ref. 16 is a sculpting tool

FIG. 5 is a view of the user removing a damaged identifier. Users may utilize a scraping tool 16 on the controller's surface area 4 on the automobile control panel 1. Before applying the label 9 to the surface area 4, the faded identifier 8 needs to be completely removed to create an even surface area. A tool such as a sculpting or utility knife 16 may be used to scratch the remainder of the identifier. Other tools such as scissors or a dull knife may be used. The original portion of the identifier is scratched off to create a smooth surface area. In addition, the users may sand the entire surface area 4 to create a slightly textured surface for better bonding of the label. After the scratching and smoothening, the user may clean the surface area 4 of the controller and remove any debris.

Figure 6:
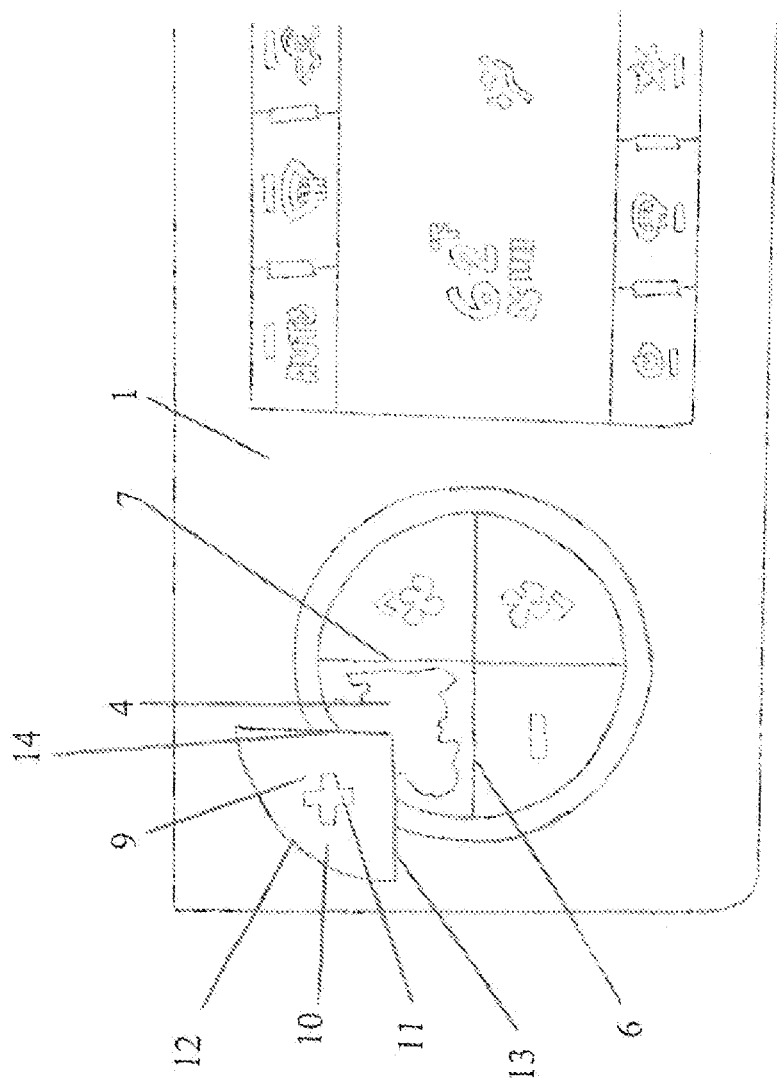
FIG. 6 is a view of the installation of a new label on a controller
Ref. 1 is an automobile control panel
Ref. 4 is the surface area of the controller
Ref. 6 is the horizontal inner boundary of the controller
Ref. 7 is the vertical inner boundary of the controller
Ref. 9 is a label
Ref. 10 is the surface area of the label
Ref. 11 is the marked identifier on the label
Ref. 12 is the outer boundary of the label
Ref. 13 is the horizontal inner boundary of the label
Ref. 14 is the vertical inner boundary of the label

FIG. 6 is a view of the installation of a new label on a controller. The control panel 1 includes various controllers. A label 9 with an identifier 11 is affixed to the surface area 4 of the controller 2. The outer boundary of the label 12, the horizontal inner boundary of the label 13 and the vertical inner boundary the label 14 are aligned with the outer boundary of the controller 5, the horizontal inner boundary of the controller 6, and the vertical outer boundary of the controller 7 and carefully affixed. An adhesive may be added to the backside of the label 15 or may be added to the surface area of the controller 4. In attaching the label 9, tools such as tweezers or fingers may be used. After the label is affixed, pressure may be added to remove any air bubbles between the surface area of the controller 4 and the label 9.

Figure 7:
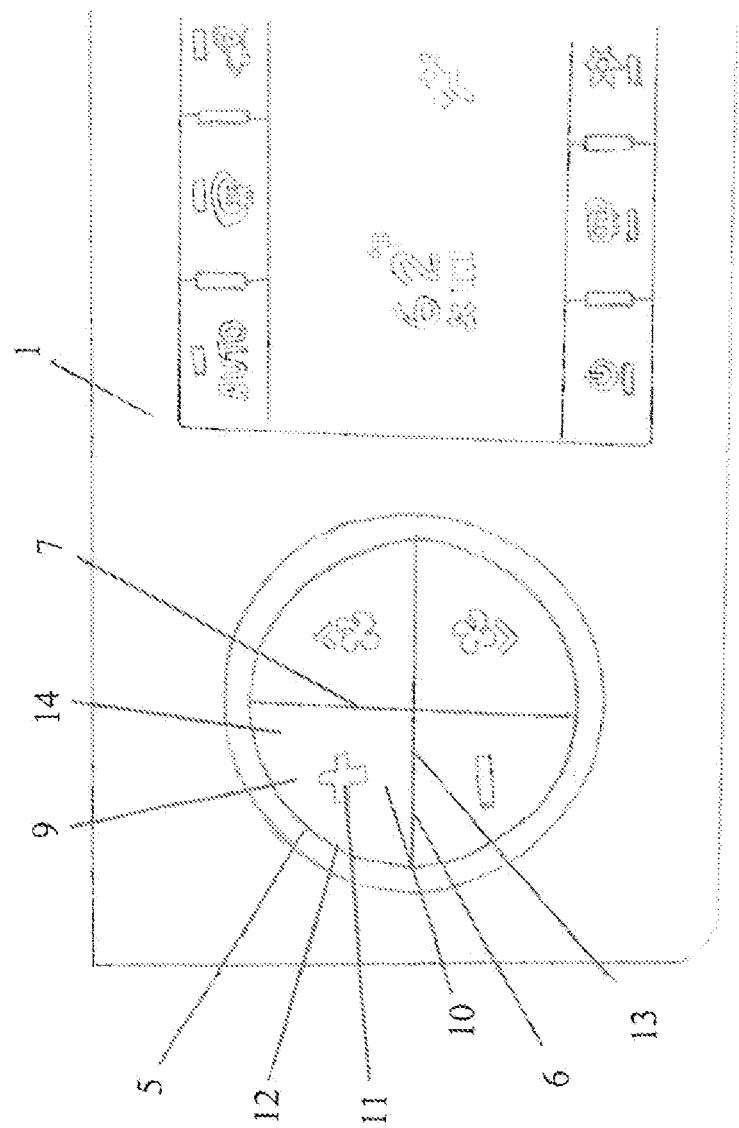
FIG. 7 is a view of the control panel after the restoration
Ref. 1 is an automobile control panel
Ref. 5 is the outer boundary of the controller
Ref. 6 is the horizontal inner boundary of the controller
Ref. 7 is the vertical inner boundary of the controller
Ref. 9 is a label
Ref. 10 is the surface area of the label
Ref. 11 is the marked identifier on the label
Ref. 12 is the outer boundary of the label
Ref. 13 is the horizontal inner boundary of the label
Ref. 14 is the vertical inner boundary of the label

FIG. 7 is a view of a restored controller. The control panel 1 includes the controller 2, which includes the label 9 with the marked identifier 11 attached to the controller 2 instead of the previous faded identifier 8. The restoration system involves aligning the outer boundary of the controller 5 with the outer boundary of the label 12, the inner horizontal boundary 6 with the inner horizontal boundary of the label 13, and the inner vertical boundary 7 with the inner vertical boundary of the label 14. The restored controller is indistinguishable in appearance from the original device such that the after-market alteration is not readily detectable or noticeable.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure and the following claims.

What is claimed is:

1. A restored vehicle comprising:
   a. a vehicle controller for climate control, defroster activation, air flow mode control, seat position or another controller operated by a hand of a user of a restored vehicle; and
   b. a restoration apparatus installed on the vehicle controller, the restoration apparatus comprising:
      (i) a sheet of material, wherein the sheet of material is made of material selected from the group consisting of: paper, plastic, and vinyl and mimics a look of an original vehicle controller and addresses fading and disappearance of original automobile manufacturer identifies on the vehicle controller;
      (ii) an adhesive disposed on a side of the sheet of material, wherein the adhesive resists damage from light, temperature, and humidity; and
      (iii) an identifier formed on an opposite side of the sheet of material from the side having the adhesive, the identifier identical in shape, size, and color and providing light from a light source behind the vehicle controller that mimics the look of the original vehicle controller; and
   wherein the restoration apparatus forms a restored controller of the restored vehicle that is uniform and continuous in appearance and indistinguishable in appearance from the original automobile manufacturer identifiers providing visually similar illumination from the light source such that the alteration is not readily detectable or noticeable and prevents replacement of an entire control panel of the restored vehicle and eliminates chances for error or misalignment.

2. The restored vehicle of claim 1, wherein the sheet of material is shaped substantially equivalent to the shape of a label receiving surface of the vehicle controller.

3. The restored vehicle of claim 2, wherein the adhesive is selected from the group consisting of: epoxy, cyanoacrylates, and polyurethane.

4. The restored vehicle of claim 3, wherein the appearance of the identifier is substantially equivalent to the original automobile manufacturer identifiers of the vehicle controller.

5. The restored vehicle of claim 4, wherein the vehicle controller is selected from the group consisting of a button, switch and a knob.

6. The restored vehicle of claim 5, wherein the identifier is selected from the group consisting of a temperature, air flow, and stereo.

* * * * *